United States Patent
Bourlon et al.

(10) Patent No.: US 8,146,232 B2
(45) Date of Patent: Apr. 3, 2012

(54) PROCESS OF ASSEMBLY OF MASTER CYLINDER

(75) Inventors: Philippe Bourlon, Dammartin en Goele (FR); Lionel Bourgois, Montmagny (FR)

(73) Assignee: Robert Bosch GmbH, Stuttgart (DE)

( * ) Notice: Subject to any disclaimer, the term of this patent is extended or adjusted under 35 U.S.C. 154(b) by 1086 days.

(21) Appl. No.: 12/030,602

(22) Filed: Feb. 13, 2008

(65) Prior Publication Data

US 2008/0196242 A1    Aug. 21, 2008

(30) Foreign Application Priority Data

Feb. 16, 2007 (FR) ...................................... 07 01188

(51) Int. Cl.
*B23Q 3/00* (2006.01)
(52) U.S. Cl. ........................................................ 29/468
(58) Field of Classification Search ................... 29/418, 29/426.1, 426.5, 428, 451, 464, 468; 60/562, 60/583, 585
See application file for complete search history.

(56) References Cited

U.S. PATENT DOCUMENTS 7,100,374 B2 *   9/2006   Konig et al. .................... 60/562

FOREIGN PATENT DOCUMENTS

| DE | 10005743 A1 | 8/2001 |
|----|-------------|--------|
| JP | 2004291933  | 10/2004 |
| WO | 97/22505 A1 | 6/1997 |

OTHER PUBLICATIONS

FR07 01188 Search Report and Written Opinion, Nov. 2007.

* cited by examiner

*Primary Examiner* — John C Hong
(74) *Attorney, Agent, or Firm* — Michael Best & Friedrich LLP

(57) ABSTRACT

The invention relates to a method for fitting/removing a brake master cylinder (MC) of a motor vehicle providing the installation of a temporary retaining pin (g1) in an access hole (tr1) located on the periphery of the master cylinder (MC) so that the pin (g1) emerges inside the barrel (al1) between the mouth (MCe) of the barrel and either the primary or the secondary piston (pp or ps).

20 Claims, 3 Drawing Sheets

PROCESS OF ASSEMBLY OF MASTER CYLINDER

BACKGROUND OF THE INVENTION

The invention relates to a method for fitting and removing a vehicle brake master cylinder and in particular a master cylinder intended to be mounted on a braking assistance servo unit of a motor vehicle.

The master cylinders known in the prior art include a spring, called a secondary spring, located in the barrel between the bottom of the barrel and the secondary piston. The function of this spring is to push back the secondary piston toward the primary piston and therefore to push back the secondary piston/primary piston assembly toward the mouth of the barrel.

When the master cylinder is not mounted on the braking assistance servo unit, this spring therefore has a tendency to push back the primary piston/secondary piston assembly toward the outside of the barrel of the master cylinder.

When the master cylinder is removed, there is a risk that this spring may eject the master cylinder mechanism assembly toward the outside of the latter. There is therefore a risk of damaging the inside parts of the master cylinder or losing some of them.

To prevent that, according to a known technology, the secondary spring is provided with a mechanism to limit its travel. FIG. 1 illustrates an example of such a device. The axial barrel of the master cylinder contains the primary pp and secondary ps pistons in a manner known in the prior art. A primary spring r1 is interposed between the two pistons. A secondary spring r2 is interposed between the secondary piston ps and the bottom MCf of the barrel of the master cylinder. The assembly is inserted in the barrel of the master cylinder via the mouth MCe of the barrel. The spring rs2 bears on the bottom MCf of the barrel and tends to push back the pistons toward the outside of the barrel.

In the system in FIG. 1, the travel of the secondary spring r2 is limited by two cups c1 and c2 which slide on a rod t1. The rod t1 is provided with two collars e1 and e2 which prevent the cups from moving away from each other by more than a certain distance. This system thus limits the travel of the secondary spring r2.

The invention relates to a system making it possible to dispense with such a device for limiting the travel of the secondary spring.

It therefore provides a simplified master cylinder compared with prior art master cylinders.

The invention relates to a method for fitting and removing a master cylinder which comprises a primary piston and a secondary piston which are mounted in a barrel of the master cylinder with at least one spring placed between the bottom of the barrel and the secondary piston and having the function of pushing back the secondary piston and the primary piston toward the mouth of the barrel. According to the invention, the secondary spring is free and the method comprises at least the following step: installation of a temporary retaining pin in an access hole located on the periphery of the master cylinder so that the pin emerges inside the barrel between the mouth of the barrel and either the primary or the secondary piston. Advantageously, this pin is installed temporarily.

SUMMARY OF THE INVENTION

Advantageously, according to the method of the invention the said retaining pin is installed temporarily in the said access hole while the master cylinder is being fitted to a braking assistance servo unit.

Preferably, the said access hole is a braking pressure communicating hole between the master cylinder and a hydraulic braking circuit, or a hole for supplying the master cylinder with brake fluid.

Advantageously, the said access hole is a braking pressure communicating hole between the master cylinder and a hydraulic braking circuit.

According to a preferred embodiment of the invention, the said access hole is located between the secondary piston and the mouth of the barrel so that the pin emerges inside the barrel between the mouth of the barrel and the secondary piston.

According to one embodiment the pin is made of rigid plastic.

With regard to the construction of the pin, it could be envisioned that the diameter of a portion of the pin be generally equal to the diameter of a portion of the access hole so as to allow the insertion of the pin in the said hole with friction contact on this portion of the access hole.

Advantageously, the diameter of a portion of the pin is less than that of a portion of the access hole and includes, on its periphery, elements in the form of protuberances allowing a friction contact on the inside walls of this portion of the access hole.

It could also be envisioned that the pin might include a tapered end allowing its insertion in the access hole.

According to another embodiment of the invention, the access hole has a thread and the pin includes a threaded portion allowing the pin to be screwed into the thread of the said access hole.

According to the method of the invention, when fitting a master cylinder to a braking assistance servo unit, the following steps can be envisioned: installation of the primary and secondary pistons and their associated springs in the barrel of the master cylinder; compression of the springs; installation of the retaining pin; fitting of the master cylinder to a braking assistance servo unit; withdrawal of the retaining pin.

When removing a master cylinder the following steps can be envisioned: installation of the retaining pin; removal of the master cylinder from the braking assistance servo unit on which it is mounted.

BRIEF DESCRIPTION OF THE DRAWINGS

The various subjects and features of the invention will emerge more clearly from the description and the attached figures which illustrate:

FIG. 2b, a transverse section along line b-b in FIG. 2a of the embodiment in FIG. 2a;

FIG. 3b, a section view of the pin along line c-c in FIG. 3a;

DETAILED DESCRIPTION

Figure 1:
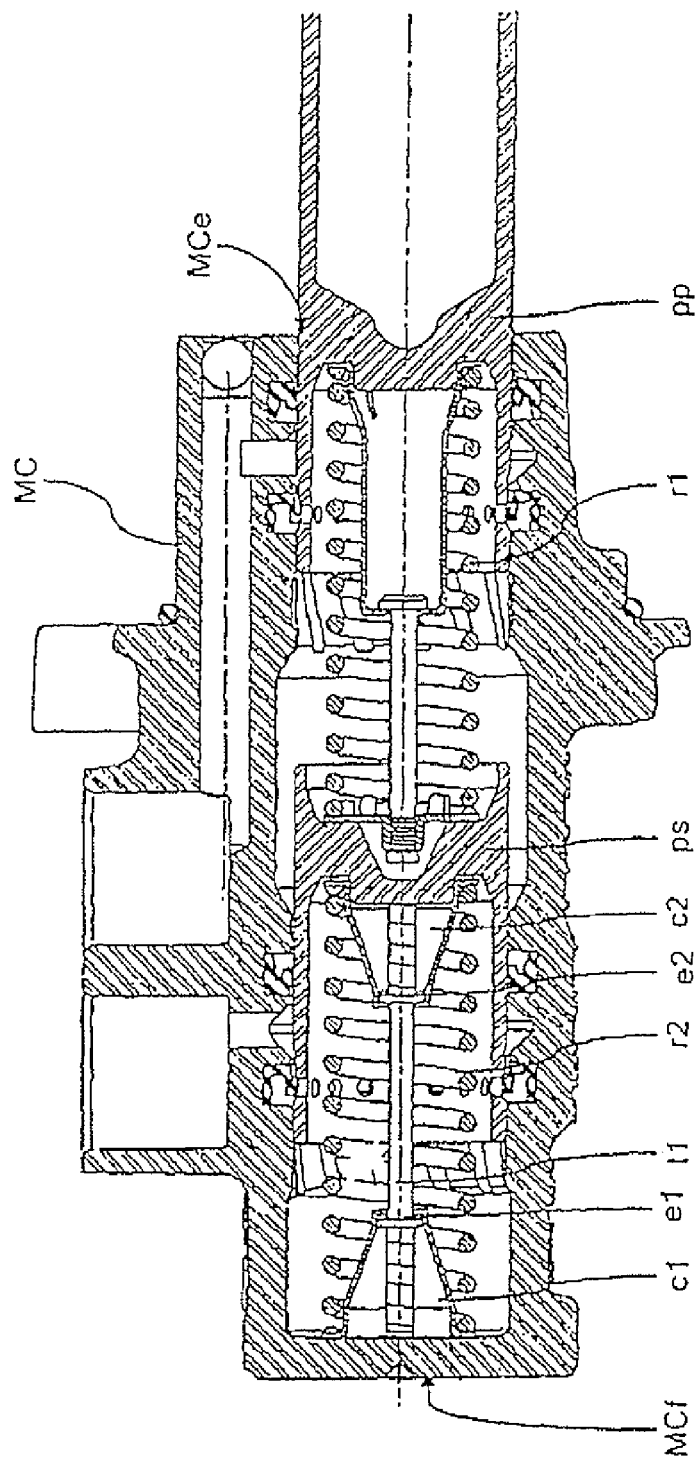
FIG. 1, a longitudinal section of a master cylinder known in the prior art and described previously.
Figure 2A:
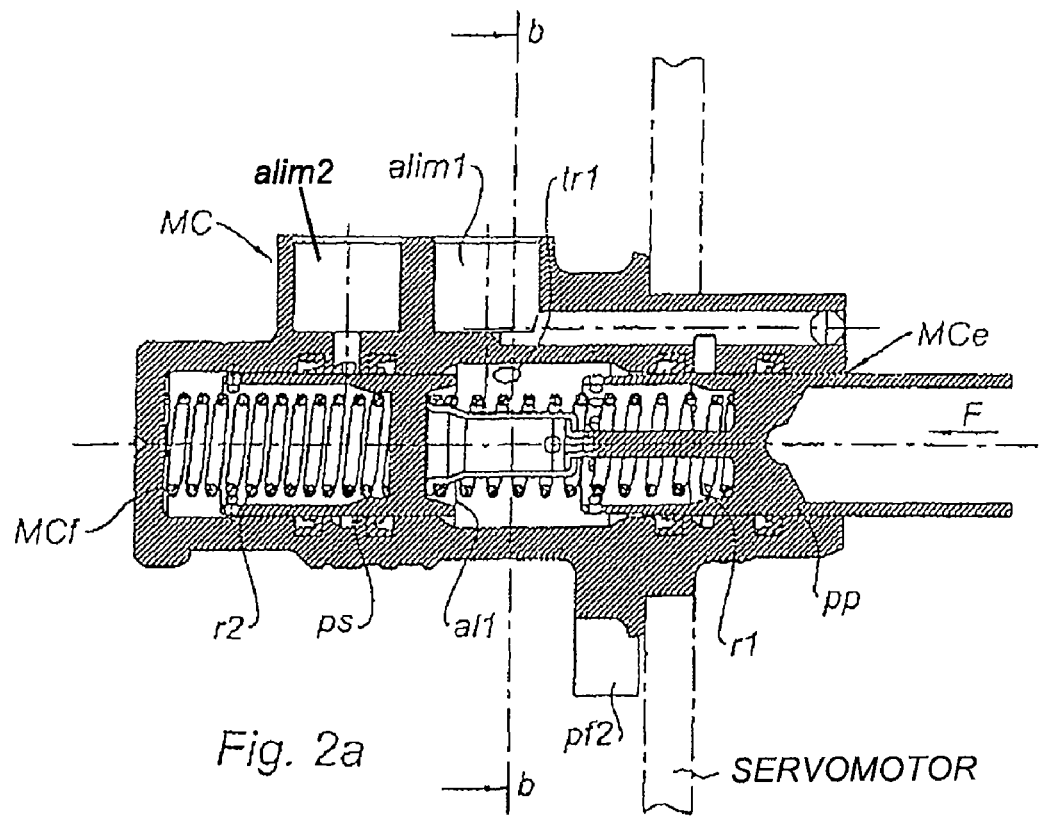
FIG. 2a, a longitudinal section along line a-a in FIG. 2b of an embodiment of a system allowing the method of the invention to be used.
Figure 2B:
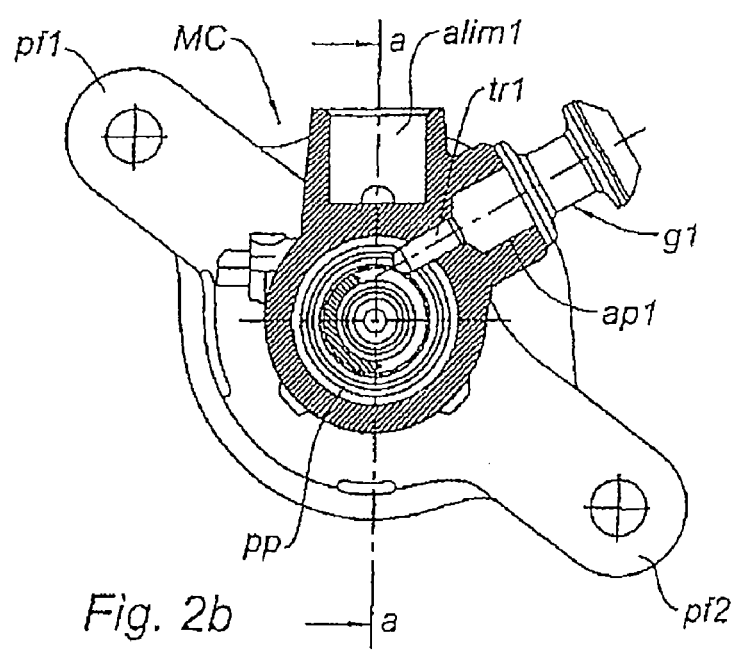

FIG. 2a illustrates through section aa a master cylinder to which the method of the invention applies and FIG. 2b illustrates a view of its section bb. To simplify matters, the same elements that are found in FIG. 1 and in FIGS. 2a and 2b are numbered in the same way in these figures as in FIG. 1.

In FIG. 2a, there is therefore a brake master cylinder MC having a barrel al1 in which have been placed the primary pp and secondary ps pistons with the primary r1 and secondary r2 springs. There are two brake fluid supply inlets alim1 and alim2 to which a brake fluid reservoir must be connected. There is also a communicating hole tr1 intended to send the braking pressure exerted, by the primary piston, into the master cylinder toward a hydraulic braking circuit.

Moreover, mounting lugs pf1 and pf2 are used to mount the master cylinder MC on a braking assistance servo unit illustrated as a broken line in FIG. 2a.

FIG. 2b illustrates a section bb cut along the axis of this hole tr1. This hole tr1 communicates with an inlet ap1 intended to be connected to a braking circuit.

In this FIG. 2b, a pin g1 has been placed in the hole tr1 and emerges in the barrel al1. When the two pistons are mounted in the barrel in the position illustrated in FIG. 2b, the pin g1 therefore emerges in the barrel between the two pistons pp and ps. The pin g1 therefore prevents the secondary piston from reversing, beyond the pin g1, toward the mouth MCe of the barrel of the master cylinder.

The method of the invention therefore consists, when removing or fitting the master cylinder to the servo unit, in placing a temporary pin g1 in the access hole tr1 to prevent the pistons pp and ps from coming out of the barrel of the master cylinder.

The method for fitting the master cylinder therefore includes the following steps:

Step 1: installation of the primary and secondary pistons pp and ps and the springs r1 and r2 in the barrel al1 of the master cylinder;

Step 2: compression of the springs r1 and r2 by pressure on the primary piston in the direction of the arrow F so as to put the pistons in a position generally such that the secondary piston ps is beyond the hole tr1 in relation to the mouth of the barrel al1 as illustrated in FIG. 2b;

Step 3: installation of the temporary retaining pin g1 in the hole tr1;

Step 4: fitting of the master cylinder to a braking assistance servo unit and mounting it using the lugs pf1 and pf2;

Step 5: withdrawal of the temporary retaining pin g1.

The master cylinder is thus mounted on the servo unit. Before the mounting on the servo unit, the manipulation carried out between Step 3 and Step 4 is therefore done in complete safety without the risk of the pistons coming out of the barrel of the master cylinder. After removing the pin, all that remains is to connect the hydraulic braking circuits to the pressure inlets such as inlet ap1 and mount the brake fluid reservoir on the inlets alim1 and alim2.

The method for removing the master cylinder consists, after disconnecting the hydraulic circuit from the inlet ap1, in introducing the pin g1 into the hole tr1. The end of the pin emerges in the barrel al1, the pistons can therefore no longer come out of the barrel al1. The master cylinder MC can be disconnected from the braking assistance servo unit in complete safety.

In the description which precedes we have considered the case where the pin is inserted in a hole (tr1) in the master cylinder used to connect the inside of the barrel of the master cylinder with a hydraulic braking circuit. Without departing from the scope of the invention, it can be envisioned that this pin is inserted in a communicating hole (alim1 or alim2) which communicates with the brake fluid reservoir provided that such a communicating hole emerges in the barrel of the master cylinder in an area which allows the pin to prevent the pistons coming out of the barrel of the master cylinder.

It can also be envisioned that the pin is inserted in a hole specially provided for this application. In that case it will be arranged that this hole can be plugged, with a threaded plug, for example, when the pin has been removed and before putting the master cylinder into service.

With reference to FIGS. 3a to 3d various possible embodiments of the pin g1 will now be described.

This pin includes a rod gf intended to be inserted in the hole tr1 of the master cylinder and of which the end ge must emerge inside the barrel al1. The diameter of the rod g1 is less than the diameter of the hole tr1. The rod gf is extended by a retaining portion gg of the pin and intended to enter the inlet ap1 of the master cylinder.

According to a first embodiment, this retaining portion gg has a diameter generally equal to or very slightly less than the diameter of the inlet ap1 so that it enters with friction contact into the inlet ap1 and the pin holds itself in place in the master cylinder due to this friction contact.

According to another embodiment illustrated by the section cc in FIG. 2b, the diameter of the retaining portion gg is less than the diameter of the inlet ap1, and the outer surface of this portion gg includes protuberances which will be in contact with the inside surface of the inlet ap1 and will hold the pin in the master cylinder by friction contact.

Figure 3A:
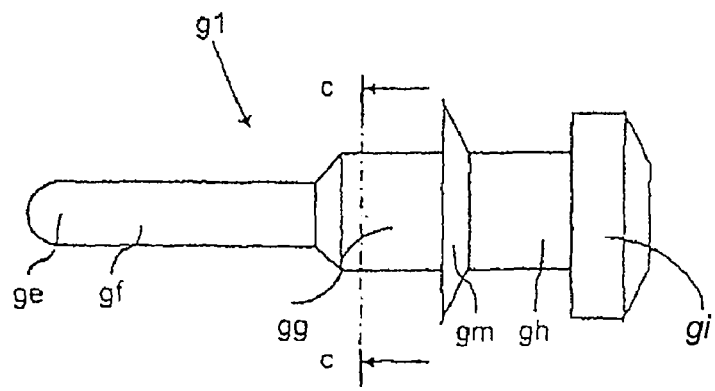
FIG. 3a, a side view of an embodiment of the pin allowing the method of the invention to be used.
Figure 3B:
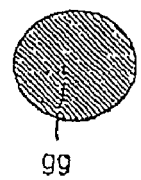
Figure 3C:
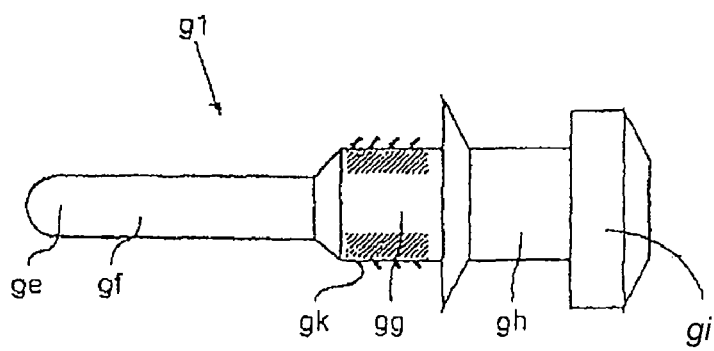
FIGS. 3c and 3d, side views of variant embodiments of the pin according to the invention.

FIG. 3c illustrates a variant embodiment in which the portion gg includes flexible peripheral fins gk intended to exert a friction contact on the inside wall of the inlet ap1.

Figure 3D:
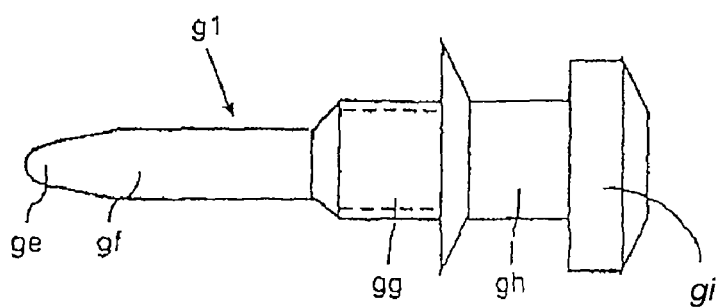

FIG. 3d illustrates another embodiment of the pin in which the retaining portion gg includes a thread intended to be screwed into a thread inside the inlet ap1.

Moreover, in these various embodiments, the end ge of the rod gf can be tapered as illustrated in FIG. 3d. This arrangement will facilitate the insertion of the pin in the hole tr1.

In addition, the retaining portion gg can include a collar gm for controlling the depth of insertion of the rod gf in the hole tr1 of the master cylinder.

The retaining portion is extended by a handle gh including an end knob gi facilitating the insertion and the withdrawal of the pin in/from the hole tr1.

The invention claimed is:

1. Method for fitting/removing a brake master cylinder (MC) which comprises a primary piston (pp) and a secondary piston (ps) which are mounted in a barrel (al1) of the master cylinder with at least one spring (r2) placed between the bottom (MCf) of the barrel and the secondary piston (ps) and having a function of pushing back the secondary piston (ps) and the primary piston (pp) toward the mouth (MCe) of the barrel, characterized in that the secondary spring (r2) is free and in that the method comprises at least the following step: installation of a temporary retaining pin (g1) in an access hole (tr1) located on the periphery of the master cylinder (MC) so that the pin (g1) emerges inside the barrel (al1) between the mouth (MCe) of the barrel and either the primary or the secondary piston (pp or ps).

2. Method for fitting/removing a master cylinder according to claim 1, characterized in that the said retaining pin (g1) is installed temporarily in the said access hole (tr1) while the master cylinder is being fitted to a braking assistance servo unit.

3. Method for fitting/removing a master cylinder according to claim 2, characterized in that the said access hole is a braking pressure communicating hole between the master cylinder and a hydraulic braking circuit, or a hole for supplying the master cylinder with brake fluid.

4. Method for fitting/removing a master cylinder according to claim 3, characterized in that the said access hole is a braking pressure communicating hole between the master cylinder and a hydraulic braking circuit.

5. Method for fitting/removing a master cylinder according to claim 4, characterized in that the said access hole is located between the secondary piston (ps) and the mouth (MCe) of the barrel, so that the pin (g1) emerges inside the barrel (al1) between the mouth (MCe) of the barrel and the secondary piston (ps).

6. Method for fitting/removing a master cylinder according to claim 5, characterized in that the pin is made of rigid plastic.

7. Method for fitting/removing a master cylinder according to claim 6, characterized in that the diameter of a portion (gg) of the pin is generally equal to the diameter of a portion of the access hole (ap1) so as to allow its insertion in the said hole with friction contact on the portion of the access hole.

8. Method for fitting/removing a master cylinder according to claim 6, characterized in that the diameter of a portion (gg) of the pin is less than that of a portion (ap1) of the access hole and includes, on its periphery, elements in the form of protuberances allowing a friction contact on the inside walls of the portion of the access hole.

9. Method for fitting/removing a master cylinder according to claim 6, characterized in that the access hole has a thread and in that the pin (g1) includes a threaded portion allowing the pin to be screwed into the thread of the said access hole.

10. Method for fitting/removing a master cylinder according to claim 6, characterized in that the pin (g1) includes a tapered end (ge) allowing its insertion in the access hole.

11. Method for fitting/removing a master cylinder according to claim 1, characterized in that the said access hole is a braking pressure communicating hole between the master cylinder and a hydraulic braking circuit, or a hole for supplying the master cylinder with brake fluid.

12. Method for fitting/removing a master cylinder according to claim 11, characterized in that the said access hole is a braking pressure communicating hole between the master cylinder and a hydraulic braking circuit.

13. Method for fitting/removing a master cylinder according to claim 12, characterized in that the said access hole is located between the secondary piston (ps) and the mouth (MCe) of the barrel, so that the pin (g1) emerges inside the barrel (al1) between the mouth (MCe) of the barrel and the secondary piston (ps).

14. Method for fitting/removing a master cylinder according to claim 1, characterized in that the pin is made of rigid plastic.

15. Method for fitting/removing a master cylinder according to claim 1, characterized in that the diameter of a portion (gg) of the pin is generally equal to the diameter of a portion of the access hole (ap1) so as to allow its insertion in the said hole with friction contact on the portion of the access hole.

16. Method for fitting/removing a master cylinder according to claim 1, characterized in that the diameter of a portion (gg) of the pin is less than that of a portion (ap1) of the access hole and includes, on its periphery, elements in the form of protuberances allowing a friction contact on inside walls of the portion of the access hole.

17. Method for fitting/removing a master cylinder according to claim 1, characterized in that the access hole has a thread and in that the pin (g1) includes a threaded portion allowing the pin to be screwed into the thread of the said access hole.

18. Method for fitting/removing a master cylinder according to claim 1, characterized in that the pin (g1) includes a tapered end (ge) allowing its insertion in the access hole.

19. Method for fitting/removing a master cylinder according to claim 1, characterized in that it includes, when fitting a master cylinder to a braking assistance servo unit, the following steps: installation of the primary and secondary pistons and their associated springs in the barrel of the master cylinder; compression of the springs; installation of the retaining pin; fitting of the master cylinder to a braking assistance servo unit; withdrawal of the retaining pin.

20. Method for fitting/removing a master cylinder according to claim 1, characterized in that it includes, when removing a master cylinder, the following steps: installation of the retaining pin; removal of the master cylinder from a braking assistance servo unit on which it is mounted.

\* \* \* \* \*